United States Patent
Don et al.

[11] Patent Number: 5,643,390
[45] Date of Patent: Jul. 1, 1997

[54] BONDING TECHNIQUES FOR HIGH PERFORMANCE THERMOPLASTIC COMPOSITIONS

[75] Inventors: Roderic C. Don, Newark; John W. Gillespie, Jr., Hockessin; Steven H. McKnight, Dover, all of Del.

[73] Assignee: The University of Delaware, Newark, Del.

[21] Appl. No.: 434,459

[22] Filed: May 4, 1995

[51] Int. Cl.⁶ ............................................. B32B 9/00
[52] U.S. Cl. ........................... 156/307.1; 156/309.6; 156/313; 156/307; 427/393.5
[58] Field of Search ............................ 156/83, 307.1, 156/307.7, 308.2, 309.6, 313, 330, 327; 427/393.5

[56] References Cited

U.S. PATENT DOCUMENTS

| | | | |
|---|---|---|---|
| 5,248,711 | 9/1993 | Buyny et al. | |
| 5,264,059 | 11/1993 | Jacaruso et al. | 156/148 |
| 5,304,269 | 4/1994 | Jacaruso et al. | 156/94 |
| 5,322,580 | 6/1994 | McIntire et al. | 156/148 |
| 5,342,464 | 8/1994 | McIntire et al. | 156/172 |
| 5,389,184 | 2/1995 | Jacaurso et al. | 156/378 |

*Primary Examiner*—Michael W. Ball
*Assistant Examiner*—Sam Chuan Yao
*Attorney, Agent, or Firm*—Connolly & Hutz

[57] ABSTRACT

This invention is a new process to promote adhesion between thermoplastic polymers and thermosetting resin adhesives. This is accomplished by selecting a third "interlayer" polymer which is compatible with both the thermoplastic and thermoset polymers. This compatible interlayer is incorporated with the thermoplastic polymer during fabrication to provide the finished part surface with a layer of the compatible film. Upon adhesive bonding, diffusion of the thermosetting adhesive molecules into the compatible film occurs before complete cure, or hardening of the thermosetting adhesive. After completion of cure an Interpenetrating Network (IPN) is formed. Molecular entanglement in this network provides superior adhesive strength enhancement.

17 Claims, 2 Drawing Sheets

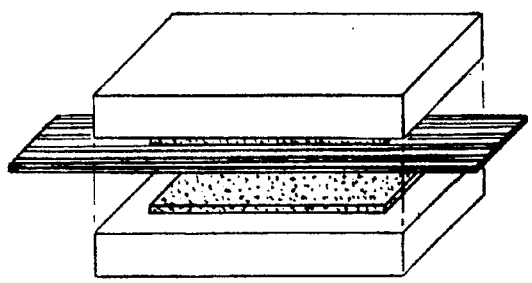
Fig. 1A. Assembly
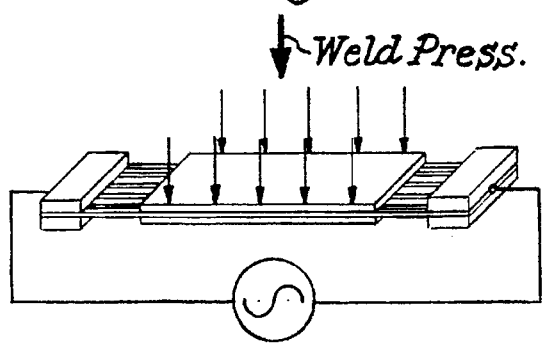
Fig. 1B. Welding
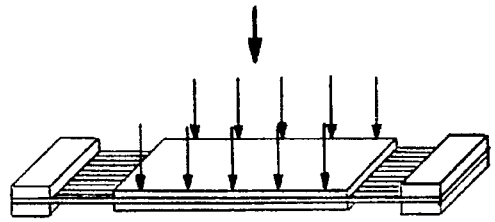
Fig. 1C. Cooling
Fig. 2.
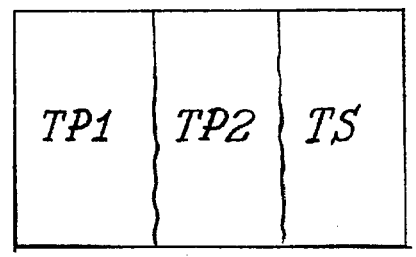
Fig. 3.
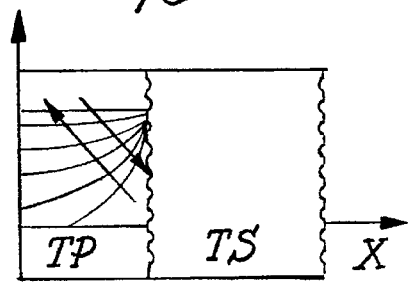
Fig. 4.

BONDING TECHNIQUES FOR HIGH PERFORMANCE THERMOPLASTIC COMPOSITIONS

BACKGROUND OF THE INVENTION

Most thermoplastic (TP) polymers are not easily bonded using thermosetting (TS) structural adhesives such as epoxies, due to their inherently low reactivity, surface energies, and polarities. These difficulties can be resolved in a number of ways. The use of surface treatments to increase the wettability and polar nature of the thermoplastics will increase the potential for adhesive bonding to these materials. Techniques such as corona discharge, plasma treatments, acid etches, and oxidizing flame treatments have all been proposed as suitable surface preparation methods for thermoplastics which are not easily joined with thermosetting adhesives. While these approaches can be very effective, they have several disadvantages. Most notably, the treated surfaces do not maintain their characteristics for an infinite period. If the adhesive is not placed on the treated surface within a certain time period, the active surface's ability to promote strong bonding may be diminished or potentially eliminated due to contamination. Additionally, the equipment used in some of these procedures is quite expensive, and the maximum part size which can be treated may be restricted. Thus, much care must normally be taken when bonding thermoplastics with thermoset adhesives. A new technique with virtuality unlimited shelf life at room temperature is needed.

Joining of fully cured thermoset (TS) composite structural components has previously been limited to mechanical fasteners and traditional adhesives technology. Due to the high degree of crosslinking of cured thermosets, post-fabrication fusion bonding is not possible.

U.S. Pat. No. 5,264,059; U.S. Pat. No. 5,304,269 and U.S. Pat. No. 5,389,184 all issued to Jacaruso et al, and claiming priority to Ser. No. 628,245 filed Sep. 17, 1990, disclose a method of bonding thermoset composite structures to a pair of adhesive strips. The adhesive strips are comprised of a layer of semi-crystalline thermoplastic material. A heating element is used to bond them during fusion bonding.

We have found surprisingly that it is not necessary to fusion bond using a heating element. In addition, we found that it is also not necessary to use a layer of crystalline thermoplastic material.

SUMMARY OF THE INVENTION

An object of this invention is to develop a novel technique with virtually unlimited shelf life to greatly ease the bonding of these materials.

Another object of this invention is to develop a method in applying traditional thermoplastic composite welding technology to thermoset composites.

Another object of this invention is to bond any thermoplastic material with any thermosetting material by using an inter layer between both the thermoplastic and thermosetting materials.

Another object of this invention is to develop a method of fusion or adhesive bonding of thermoset composites.

We have developed a new method of fusion bonding of thermoplastic material to thermosetting material. We have developed a new technique which allows fusion or adhesion bonding through the use of a hybrid material cocured with the TS during fabrication (e.g. autoclave and resin transfer molding). We have also developed a method to yield a fusion-bondable TP surface is direct cocuring of a compatible TP with the TS. The advantages of fusion or adhesive bonding versus traditional joining methods for thermoset matrix composites are:

(1) reduced parts count versus fasteners;

(2) minimal surface preparation, in many cases a simple solvent wipe to remove surface contaminants;

(3) indefinite shelf life at room temperature;

(4) short process cycle time, typically measured in minutes; and (5) enhanced joint performance, especially hot/wet and fatigue applicable to rapid field repair of composite or other structures.

We have found new methods to apply traditional thermoplastic composite welding technology to thermoset composites. We have developed a new method for fusion bonding of thermoset matrix composites. One embodiment enables the user to select any thermoplastic material with any thermosetting material by using an inner layer between both the thermoplastic and thermosetting materials. The first embodiment is the hybrid interlayer element system. The interlayer is amorphous.

We have developed a process of manufacturing a polymer matrix composite material, comprising:

(a) processing a thermoplastic material with an inter-layer material to form an amorphorous thermoplastic film, wherein said inter-layer material is dry on one side and has a plurality of holes, pits, compressions or gaps in said material;

(b) placing said amorphous thermoplastic film on a thermosetting material to form composite and (c) curing said composite.

We have also developed a process of adhesively bonding a polymer matrix composite material comprising:

(a) processing a thermoplastic material with an inter-layer material to form an amorphorous thermoplastic film, wherein said inter-layer material is dry on one side and has a plurality of holes, pits, compressions or gaps in said material;

(b) placing said amorphous thermoplastic film on a thermosetting material to form composite, (c) curing said composite, and (d) adhesively bonding said composite to the same or different material(s).

Another approach that we have recently developed is the use of compatible thermoplastic films to enable thermoset bonding to otherwise difficult to bond thermoplastic adherends. In this approach, another thermoplastic polymer is used to create an interphase between the thermoplastic adherend and the thermoset adhesive. However, this method for creating a readily bondable thermoplastic layer (TP1) on a thermoplastic substrate (TP2) comes with the constraint of choosing compatible materials.

We have developed a process of manufacturing a composite material comprising: selecting a thermoplastic material and a thermosetting monomer wherein said thermosetting monomer has similar solubility parameters to that of said thermoplastic material, bonding said thermoplastic material to said thermosetting monomer and creating a cocured material.

We have also developed a process of bonding a thermoplastic layer to a thermoset composite comprising:

selecting a thermoplastic material and a thermosetting monomer wherein said thermosetting monomer has similar solubility parameters to that of said thermoplastic material, bonding said thermoplastic material to said thermosetting monomer creating a cocured material and then processing said cocured material with either a thermoset adhesive or bond by fusion.

Common to both material systems is a fusible thermoplastic surface layer.

A BRIEF DESCRIPTION OF THE FIGURES

FIGS. 1A–1C show a schematic of the resistance weld material according to this invention.

FIG. 2 shows a hybrid thermoplastic surface layer being bonded to a thermoset matrix.

FIG. 3 is a schematic representation of the compatible polymer interphase concept for enchanting bonding between thermoplastic and thermosetting polymers.

FIG. 4 is a conceptual figure displaying the effects of diffusion on final concentration of TS pre-polymers in thermoplastic (TP) film.

DETAILED DESCRIPTION OF PREFERRED EMBODIMENT

Figure 5:
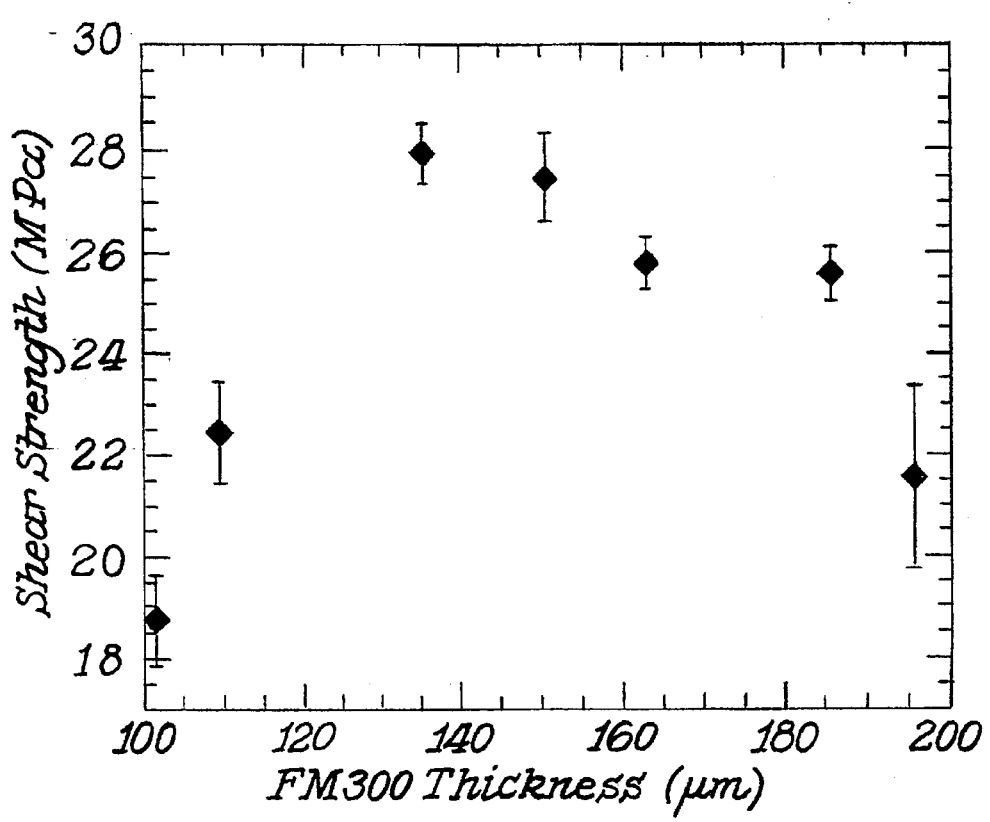
FIG. 5 shows a graph of shear strength of FM300K adhesive bonds vs adhesive bondline thickness.
Figure 6:
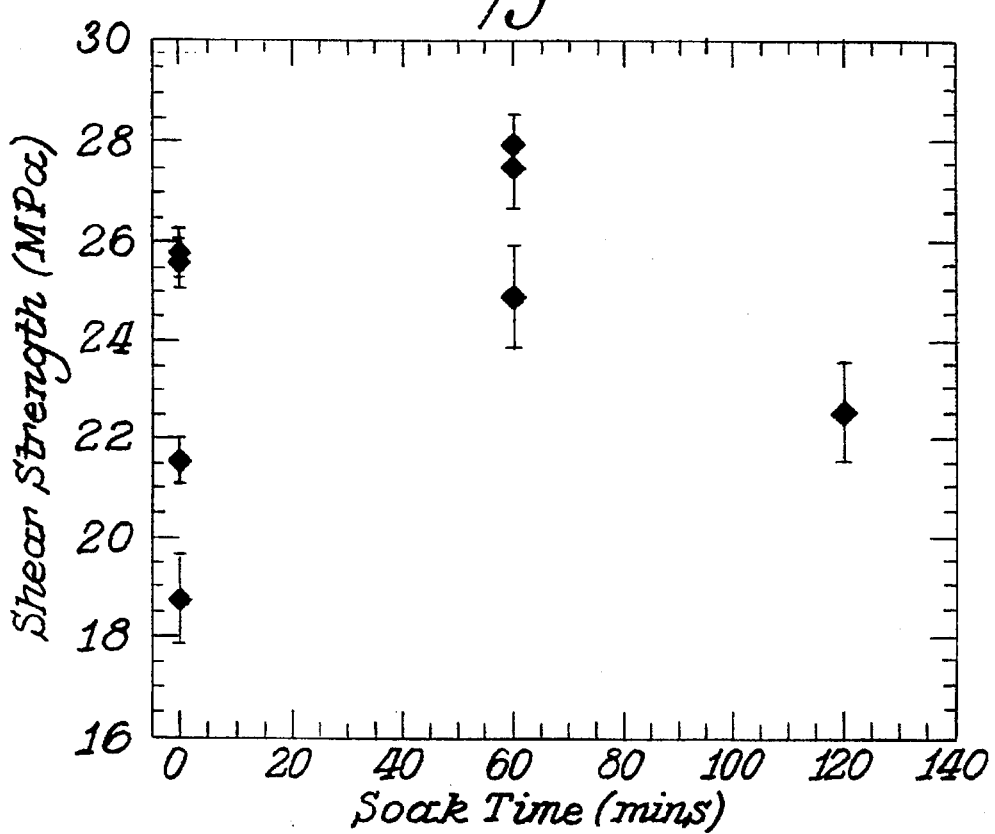
FIG. 6 shows a shear strength of FM300K adhesive bonds vs soak time at intermediate temperature.

We have developed a new method for adhesive bonding of thermoset matrix composites. One embodiment enables the user to select any thermoplastic material with any thermosetting material by using an inter layer between both the thermoplastic and thermosetting materials. The first embodiment is the hybrid interlayer element system. Preliminary trials of carbon fiber/polyetheretherketone (PEEK) thermoplastic hybrid consolidated with a common thermoset composite demonstrated good hot/wet and fatigue performance versus thermosetting adhesives. Direct cocuring of thermoplastic film with the thermoset is an alternative method and is described in detail, including a methodology for selection of compatible polymers. Results of test welds using the cocure method with 'a representative material system are reported.

There are various methods for welding composites. They differ mainly in the mechanism of heat generation at the bond interface. Examples are frictional (vibration and spin welding), ultra-sonic, infrared, induction, and resistive implant or resistance welding.

We have developed a new technique which allows adhesive bonding through the use of a hybrid material cocured with the TS during fabrication (e.g. autoclave and resin transfer molding). Another method we developed to yield a fusion-bondable TP surface is direct cocuring of a compatible TP with the TS. Both of these methods are described in detail below.

Resistance Welding

FIG. 1 shows a schematic of the resistance weld material stack, with the resistive implant or heating element sandwiched between the parts to be joined. Additional thermoplastic film layers can be added to provide resin for gap-filling as dictated by surface roughness and mismatch or warpage. Insulated tooling can be used to apply the necessary consolidation pressure during heating and subsequent cooling. The heating element can consist of a single ply of unidirectional carbon fiber prepreg with the same matrix as that of the interface being bonded. Alternatively, expanded stainless steel mesh has been used successfully for heating element stock, but must be impregnated with the desired TP polymer before use.

We developed two methods for creating a bondable TP surface layer on TS composite laminates. The material choice and fabrication steps differ between the two methods. However, the bonding technology is essentially identical for either approach. The first method is with the use of a thermoplastic hybrid interlayer.

A. Thermoplastic Hybrid Interlayer

A hybrid interlayer is fabricated from material that contains pores, holes, pits, perforations or the like. An example of such a material is a woven carbon fiber cloth. The hybrid interlayer is fabricated from a material such as, but not limited to a woven carbon fiber cloth which is processed in a TP film prepregging step. The film is an amorphorous thermoplastic film. The film will not work unless it is amorphous. Impregnation is carefully controlled to limit the flow of TP resin through the thickness, so that one side remains as essentially dry carbon fiber.

The hybrid is added to the TS material stack before curing (in the autoclave, mold, oven, etc.) and is normally placed only in the regions to be bonded. Excess TS resin bleeds into the dry carbon side of the interlayer during the cure step, physically locking it in place. This effectively adds reinforcement to the composite laminate in the bond region (see FIG. 2), which may be an important consideration in the design of the joint. The hybrid method can be used to mate virtually any TP to any TS composite, as chemical compatibility of the polymers is not an issue, although it is desirable for the TP to have sufficiently high viscosity throughout the TS cure cycle to minimize flow of the TP, thereby retaining the fusion bondable TP surface layer. Conversely, a TP with an extremely high welding temperature such that significant degradation of the TS matrix is unavoidable also would make a poor choice, as optimum bonding would be unachievable.

B. Thermoplastic Film Cocure

The cocure method for creating a fusion-bondable TP on a TS composite is simpler in execution, but comes with the constraint of choosing compatible materials. A methodology for selection of compatible cocure polymers is described in detail below. There are two interfaces which must be considered when identifying potential compatible polymers: The TP2-TS and the TP1-TP2 interface (see FIG. 3). Though essentially the same conditions must be met with both interfaces, there are some subtle differences.

A. Thermoplastic-Thermoset Interphase

The first consideration is the development of the bond at the TP2-TS interface. A starting point for this concept is work done on "interleaving" of TP polymer films in thermosetting composite laminates during cure. Interleaving has been proposed as a method of improving the fracture toughness of TS laminates. The interleaved films are typically plasma treated to improve the film/thermoset interfacial bond. This type of bond is primarily an adhesive one. This technique could be applied directly to resistance welding.

More desirable would be true interdiffusion of the TP polymer and TS pre-polymers, and curing of the TS while in the TP polymer. A diffuse interphase would permit the formation of a semi-interpenetrating network (semi-IPN), and the TP-TS bond strength could be enhanced by the entanglements of the TP molecular chains and the TS-network structure found in this region. This requires miscibility and hence true chemical compatibility of the polymers, versus simple wetting and bonding due to secondary van der Waals interactions as is the case for, say, bonding to the etched material. Here, two important phenomenon can be identified as critical to the development of a strong, diffuse thermoplastic-thermoset interphase: solution compatibility, and interdiffusion across the original interface.

Solution Compatibility

For mixing to take place at the TS-TP interface there must exist a thermodynamic driving force for the process to occur. The solution behavior of polymers has been widely investigated and several theories of varying complexity have been developed Fredrickson, G. H. in "Physics of Polymer Surfaces and interfaces: L C. Sanchez ed., p. 1, Butterworth-Heinemann, Boston, (1992); Palmese, G. R, , Ph. D. Dissertation, Dept. of Chemical Engineering, University of Delaware, 1992; Wu, S., Polymer Interface and Adhesion, M. Decker, New York, N.Y., 1982, pp. 380–387. An excellent starting point for this phenomenon is the lattice theory for polymer solution compatibility developed by Flory and Huggins. For the case of uncured thermosetting pre-polymers with molecular weights much less than those of the thermoplastics, it is convenient to consider the uncured thermoset as a solvent which will swell the thermoplastic polymer as mixing occurs. The thermodynamic condition for molecular mixing is that the Gibb's free energy of mixing, $\Delta G_m$, is less than or equal to zero:

$$\Delta G_m = \Delta H_m - T\Delta S_m \leq 0 \quad (1)$$

One can use the Flory-Huggins lattice model to express the free energy of mixing as follows:

$$\Delta G_m = [1/2zN(\Phi_a\Phi_b(2w_{ab}-w_{aa}-w_{bb}))] + [kT(N_a \ln\Phi_a + N_b\ln\Phi_b)] \quad (2)$$

where z is the number of nearest neighbors in the lattice (the lattice coordination number), N is the total number of sites, $\Phi$ is the volume fraction of a and b respectively, and w represents the pairwise interaction energies of two adjacent sites. In many instances, the change in interaction energies can be easily related to the differences in the solubility parameters of the molecules using the Hildebrand-Scatchard equation to give the enthalpy of missing term in equation (2):

$$\Delta H_m = V\Phi_a\Phi_b(\delta_a-\delta_b)^2 \quad (3)$$

where $\delta_a$ and $\delta_b$ are the Hildebrand solubility parameters of species a and b, and V is the total volume. The maximum solubility of polymer-a in polymer-b can be determined by evaluating the minimum of the free energy of mixing. One-phase mixtures (mixing at the interface) are possible when the second derivative of $\Delta G_m$ with respect to volume fraction is greater than or equal to zero. This occurs when the usually positive enthalpy of mixing term is small compared to the negative entropic term; i.e., when the solubility parameters of the two polymers are close in value. Infinite solubility occurs when the solubility parameters are identically matched. When the thermoset is in an uncured stave, the entropy term will be relatively large. However, as the crosslinking reaction starts, the entropic term will diminish due to conformational effects. Although this is not accounted for in this treatment, adjustments could be made to the basic theory to relate phase behavior to the increasing thermoset molecular size. However, the outlined approach is a first approximation into predicting which thermosetting pre-polymers have thermodynamic compatibility with any given thermoplastic polymer.

Kinetic Considerations-Interdiffusion

The interfacial mixing which my be predicted by thermodynamic considerations is a necessary, but insufficient condition for providing a compatible TS-TP interface. Additionally, the ability to reach or sufficiently approach the equilibrium mixed state must exist. The mobility of the TS monomer must be high enough in the TP to reach the equilibrium penetration distance before the cure concludes. Ideally, this would occur when the TP polymer is in the amorphous or melt state. The mobility of the TS monomer must be high enough in the TP to reach the equilibrium penetration distance before the cure concludes. The mobility of penetrants in semi-crystalline polymers is extremely small, and this prevents the formation of an interpenetrating network to provide adhesive strength. Also, if the TP is reactive with the TS, this provides another mechanism for adhesive bond formation at the TS-TP interface. All of these conditions must be evaluated for each pair of materials to determine the best possible compatibility.

Presently, there is very little data available for the interdiffusion of thermoplastic and thermoset polymers. We evaluated the diffusivity of epoxy and amine prepolymers in different polymers. The diffusivity of an epoxy pre-polymer into polystyrene at room temperature (T—23° C.) has been measured using a novel Fourier infra-red spectroscopy reflection technique (FTIR-ATR). The value of the diffusivity of the epoxy in this case was measured to be $1.05\times10^{-12}$. This value is extremely small, indicating that at room temperature, diffusion of the thermoset pre-polymers can be very slow and a limited amount of interdiffusion should be expected. Qualitatively, we found diffusion to be much more rapid at modest temperature increases above room temperature.

It can be easily envisioned that as temperature increases, the characteristic time for diffusion decreases, indicating further penetration for a given time period. At the same time the characteristic time for network gelling is also decreased, meaning that the ultimate penetration may not be reached due to mobility restrictions. Most likely, there will be a temperature at which the final penetration depth is maximized. Conditions should be evaluated to produce the optimal degree of interfacial entanglement.

We have found that the polysulfone family of TP's are compatible with epoxy-based resins, and epoxy/polysulfone (PS) and epoxy/polyethersulfone (PES) pairs have been successfully bonded. Table 1 displays ranges of the solubility parameters ($\delta$'s) for PES and typical epoxy monomers, demonstrating their compatibility via the criteria just outlined. The glass transition temperature of PES is above the normal processing temperature range of the epoxy systems, making it suitable for cocure.

TABLE 1

| Material | δ (J/cm²)^(1/2) | $T_g$ (°C.) | $T_p$ (°C.) | Physical State |
|---|---|---|---|---|
| Polystyrene | 17–19 | 100 | — | Amorphous Polymer |
| Polysulfone | 19.5–22* | 192 | — | Amorphous Polymer |
| Polyethersulfone | 20–23* | 216 | — | Amorphous Polymer |
| Epoxy Monomers | 17–21† | n/a | 170–200** | Reacting Pre-polymer |
| Amine Curing Agents | 17–22† | n/a | 170–200** | Reacting Pre-polymer |

*Calculated from values of surface tension using method proposed by Gordon, J. L. in Cohesive Energy Density, in Encyclopedia of Polymer Science and Technology, 1964, p. 833
**Ranges of epoxy cure temperatures for typical systems Table 1 displays ranges of the solubility parameters (δ's) for PES, PS and typical epoxy and curing agent pre-polymers, demonstrating their compatibility via the criteria just outlined. Additionally, it was determined experimentally that both PS and polyetherimide (PEI) are compatible with bismaleimide (BMI). Additionally, it was determined experimentally that both PS and polyetherimide (PEI) are compatible with bismaleimide (BMI).

THERMOPLASTIC-THERMOPLASTIC INTERPHASE (TP1/TP2)

Compatibility at thermoplastic TP1 to TP2 interface is governed by the same thermodynamic considerations which yield compatibility relations for thermoplastic-thermoset pre-polymers. The major difference that arises when considering thermoplastics, is the extremely large molecular weights. The long chain nature of thermoplastic polymers creates conformational effects which reduce the entropic driving force to mix at the interface, and complete mixing of different high polymers is not frequently observed. However, segmental mixing at the interface can occur, and the degree of segmental motion across the interface can be related to strength. The length of any chain which protrudes from the TP1 to the TP2 side of the interface (or vice versa) can be related to the probability of creating a molecular entanglement. The degree of entanglement is directly related to interface and thus bond strength and toughness. De Gennes has proposed a simple relation to predict fracture toughness for TP1/TP2 polymer-polymer interfaces (de Gennes P-G, in "Physics of Polymer Surfaces and Interfaces: I. C. Sanchez ed., p. 55, Butterworth-Heinemann, Boston, (1992)).

$$G_{Ic} \propto \exp(-2N_c(\delta_a - \delta_b)^2) \qquad (4)$$

where $N_c$ is the chemical distance between polymers (not necessarily constant for all pairs), and the solubility parameters are as defined earlier. From Eq. 4, it can be seen that there is a very sharp drop off in fracture toughness as the solubility parameters begin to differ. For that reason, it is very important that the solubility parameters of TP1 and TP2 be closely matched to achieve optimum joint performance. The solubility should be matched within ± about 2.0 (J/cm²)^(1/2), preferably within ± about 1.0 (J/cm²)^(1/2), and most preferably within ± about 0.25 (J/cm²)^(1/2).

DUAL POLYMER THERMOPLASTIC(DPT) FUSION BONDING

The primary advantage of the dual polymer technique for fusion bonding is that the parent material of the parts to be joined does not need to be fused directly, hence (in the case of thermoplastic matrix parts) the risk of extensive melting of the parts and ensuing fiber motion and possible part distortion is eliminated. A thermoplastic layer can also be added to the surface of a compatible thermoset matrix composite, either by direct cocuring or by a hybrid interlayer technique, to allow fusion bonding. The methodology for selection of compatible polymers for thermoset cocuring was described above. Regardless of the parent polymer, the preparation of the thermoplastic bonding layer is reduced to a quick wiping with a solvent such as alcohol to remove mold release agents and other possible contaminants. Additional plies of neat resin could be added for gap filling if needed. A disadvantage of the DPT technique using amorphous polymers such as PS is the reduced solvent resistance as compared to thermosetting or semicrystalline thermoplastic polymers. This drawback is not significant, as simple steps can be taken to provide physical barriers to chemical attack of the PS, such as a fillet of silicone caulking compound applied to the exposed regions of the bond (the solvent resistance of the semi-IPN bond region as examined here has not been characterized, but may provide superior properties as compared to the amorphous polymer alone).

FUSION BONDING BY RESISTANCE HEATING

For fusion bonding of a thermoplastic interface, the bond area must be heated to a temperature above the glass transition ($T_g$) of the amorphous polymer surface layer, and below the melt temperature ($T_m$) of the "parent" matrix, in the case of thermoplastic adherends. Given time at temperature above $T_g$, the interface comes into intimate contact and heals, developing interfacial strength. The difference between the $T_g$ of the bond layer and the Tm of the adherends provides a window for the process temperature, provided the proper choice of interlayer polymer is made. For the case of PS mated with a PPS parent matrix, the window is as follows: $T_g$(PS)—about 192° C.; $T_m$(PPS) about—280° C. The upper limit on the bonding temperature of about 260° C. would then be appropriate.

Modeling of the Fusion Bonding Process

A set of process models for fusion bonding of TP composites has been developed and is critical to the practical application of fusion bonding technology; hence short descriptions of the models are included here. These models were assembled for use in a knowledge-based expert system (KBES) for use in composite joint design and material selection, as well as an intelligent, optimizing process control system for fusion bonding (see FIG. 3). The process models are directly applicable to the fusion bonding of thermosets by the method described here, with the proper substitution of material properties for the heat transfer and degradation models. Selection of appropriate weld processing cycle parameters to hold TS polymer degradation within acceptable limits is a key factor.

Heat Transfer

A two-dimensional finite element heat transfer model was developed for the resistance welding process. In combination with the other models, the heat transfer model has been used successfully to explore the process window achievable with a particular material, tooling, and power supply combination for a given full-scale part geometry. Process-induced variations in bond performance were explained by large gradients in temperature, and methods for minimizing the variability were described by Holmes, S., and J. W.

Gillespie, Jr., "Thermal Analysis and Experimental Investigation of Large-Scale Resistance Welded Thermoplastic Composite Joints," Proc 25$^{th}$ Intl SAMPE Tech Conf, Philadelphia, Pa., Oct. 26–28, 1993.

Intimate Contact and Healing Models

Intimate contact is the mechanism whereby the initially rough, nonmating surfaces in a joint interface assume the same profile and become fully mated. This is achieved by holding the surfaces together at elevated temperature under pressure until flow of surface asperities occurs. Healing is defined here as the motion and entanglement of TP polymers across the bond interface, and is the mechanism that produces joint strength and toughness. Full intimate contact is a necessary condition for full healing to occur. These models are unchanged for TS welding.

Revised Polymer Thermal Degradation Model

A thermal degradation model was developed to assess nonoxidative polymer breakdown and weight loss during the relatively short duration, high temperature spikes typical of resistance welding. Degradation takes on increased importance as a limit on the allowable temperature history experienced by the thermosetting matrix due to the typically lower maximum use temperature of those materials as compared to high performance thermoplastics such as PEEK. Additionally, the model must take on two forms, as TP degradation must be monitored as well and could itself be rate-limiting with the possible higher heating rates (and hence higher temperature gradients through the thickness) for TS bonding.

Degradation mechanisms and the appropriate model parameters are being developed for several material systems including cyanate ester and some common epoxies. The model parameters are established from extensive thermogravimetric (TGA) analysis of the polymer in question. The methodology being used is described in detail in Wetzel, E., R. C. Don, and J. W. Gillespie, Jr., "Modeling Thermal Degradation During Welding of Thermoset Composites Using Thermoplastic Adhesives", Proc SPE ANTEC 94, San Francisco, May 1–5, 1994. The degradation model can be used to define the process window and explore the process cycle alternatives for TS welding. For example, it may be preferable to ramp up rapidly to a high peak temperature and use a very short dwell, rather than a prolonged dwell at a lower soak temperature, to minimize degradation, as long as the other mechanisms are satisfied. FIG. 4 shows a typical experimental temperature history measured at the interface of cyanate ester adherends with hybrid carbon/PEEK surfaces. Note the short excursion to 380° C. with zero soak time. The amount of degradation predicted for cyanate ester nearest the weld interface is minimal, with less than 0.05% weight loss of the polymer, showing that this sort of weld cycle might indeed be preferable for thermoset adherends.

Experimental Results

Using the cocure method with polysulfone cocured with BMI, specimens were welded in a single lap joint configuration. The weld parameters chosen were a constant-power heating to a 210° C. soak using a heating intensity of 50 kW/m$^2$. Time to achieve the soak temperature with this power, geometry and material system are on the order of 30 seconds. Three samples were welded for each of the weld soak times of 0, 30, and 60 seconds. These best of these welds, at the 60 second soak time, yielded joint strengths approaching 18 MPa with very low scatter. Examination of the joints post-test revealed failure in the BMI adherends for the 60 second soak welds. At the zero time soak, the failure was an adhesive one, indicating a less than optimum weld. At the 30 second soak, approximately 60% of the bond area failed in the adherend. Due to the high service temperature of BMI, where a typical postcure bake at 215° C. yields a $T_g$ of 250° C., it was not felt that polymer degradation was a factor in driving the adherend failure. A separate study for optimization of resistance welding parameters for carbon fiber/polyarylsulfone (PAS) laminates with cocured PS films showed an asymptotic strength of 17 MPa, thus the strengths achieved here reflect a limitation of the material and not the process itself.

Welds using the hybrid interlayer technology in a first-round study were done at significantly higher heating intensity, well over 100 kW/m$^2$. The exact weld parameters are not known due to use of an early generation, manually controlled welder. Fairly consistent preliminary results of 24 to 27 MPa were achievable. Currently, a computer-controlled welder with temperature feedback is being used for an in-depth study including fatigue behavior of welded joints in thermosetting adherends and their performance in a hot/wet environment.

In order to test the ultimate interfacial strength of PES cocured with carbon fiber/8551 epoxy composite, a 24 ply unidirectional laminate was autoclave cured with a single layer of PES film at the midplane. A laminate for baseline specimens (without the PES layer) was fabricated simultaneously. All specimens were prepared and tested in accordance with the ASTM D 3165-73 Standard Test Method. For the 5 PES interlayer specimens tested, a mean strength of 27.2 MPa with a standard deviation of 5.5 MPa was achieved. The failures in these samples was in the CF/epoxy plies, away from the PES/composite interface. The three baseline specimens yielded a mean shear strength of 26.7 MPa with a standard deviation of 2.1 MPa.

Resistance Welding.

A resistive implant technique ("resistance welding") for direct heating of the interface was used for this evaluation. In resistance welding of composites, a heating element is placed between the parts to be joined, and remains permanently embedded in the joint. This can actually be advantageous, because the joint can be "unwelded" by reheating if needed for repair or other reasons, either by resistance or, with the use of a metallic element, induction heating. The heating element is typically comprised of either a single ply of unidirectional carbon fiber prepreg or a sheet of expended stainless steel foil mesh. Current is passed through the heating element, causing Joule heating. The heating power needed to bond very large regions can be reduced by breaking the area up into smaller, more manageable regions that are heated separately. Fusion bonding by resistance welding has been shown in several studies to provide joint strengths approaching the strength of the parent material itself [R. C. Don, L. Bastien, T. Jakobsen, and J. W. Gillespie, Jr., "Fusion Bonding of Thermoplastic Composites by Resistance Heating," Proc 21$^{st}$ International SAMPE Tech Conf. Atlantic City, N.J., Sep. 27, 1989; Don, R. C., C. L. T. Lambing, and J. W. Gillespie, Jr., "Experimental Characterization of Processing Performance Relationships of Resistance Welded Graphite/Polyetheretherketone Composite Joints," Polymer Engineering and Science, 32, 9, pp. 620–631].

BONDING EXPERIMENTS

A surface layer (TP2) of polysulfone (PS) was used with a parent matrix (TP1) of polyphenylene sulfide (PPS).

Sample Preparation and Testing

Samples were prepared for both adhesive and fusion bonding from [0. ±45, 90]$_{2g}$ (16 ply quasi-isotropic) laminates of Quadrax S-2 glass/PPS prepreg tape, and had a single 127 μm film of neat PS, made from Amoco's Udel P1700-NT11 resin, coconsolidated to one face. The laminates were consolidated using the autoclave process cycle recommended by Quadrax for their PPS prepregs. Bonding coupons were cut from the autoclaved laminates with a diamond saw. Surface preparation was simply a thorough wiping with a rag dampened with isopropyl alcohol, followed by air drying before bonding. Examination of micrographs of bonded specimens shows a very rough surface on the top (0° ply) at the interface between the S-2/PPS and PS layers.

For the DEA bonds and the hot press fusion bonded baseline samples, a double notched shear specimen was used following ASTM D3165-73. Those coupons were 19.1 cm long by approximately 14 cm wide, and were cut after bonding into 5 2.54 cm wide specimens for testing. For the resistance welded DPT experiments, single lap shear tests (ASTM D1002) were conducted, with 10.2 cm long by 8.9 cm wide coupons which were cut into 2.54 cm wide specimens after welding. All testing was performed on an Instron 1125 test machine.

Experimental Procedure

DEA Bonds.

The adhesive chosen for the DEA bonding study was Cytec (American Cyanamid) FM300, an amine cured modified epoxy film adhesive. The 200 μm thick open knit carrier form, FM300K, was used as Cytec claims it offers the highest overall performance with that particular adhesive. Other forms of FM300 are available and are claimed to provide better bondline thickness control and gap filling ability with slightly reduced properties.

All adhesive bonding with the exception of one vacuum bagged trial took place in a Wabash heated platen hydraulic press. The adhesive samples were subjected to a slow ramp to about 177° C., then a dwell for about 60 minutes, followed by cooling to about room temperature, all under 276 kPa pressure. In an attempt to enhance diffusion of the epoxy into the PS, some double ramp cures were performed using intermediate temperatures of about 121° C. and about 143° C., with dwell times of about 60 and about 120 minutes at the first soak temperature, before a final ramp to about 177° C. for the one hour final cure as before. A single vacuum bagged trial was done in an oven, using only atmospheric pressure against the vacuum bag for applying consolidation pressure, with a cure at about 177° C. for about one hour, then cooling to room temperature with vacuum applied.

Fusion Bonding Experiments.

Stainless steel mesh heating elements were preimpregnated with PS prior to use for resistance welding. To enhance bonding between the PS and the steel, the mesh was pretreated by cleaning with acetone, then dipping in a silane solution (Dow Corning Q1-6106, 5% in methanol). The pieces were then dried in an oven at about 50° C. for about 20 minutes. To preimpregnate the mesh, it was sandwiched between 127 μm films of neat polysulfone (Udel P1700-NT11, as used in the laminate preparation), and was processed in a hot press at about 260° C. under about 689 kPa pressure for about 1 hour. Sample size was 8.9 cm wide by 10.2 cm long, with an actual bond (overlap) 2.54 cm across.

The samples were welded in the Automated Resistance Welder at the University of Delaware's Center for Composite Materials (UD-CCM). Heating intensity was set at 60 kW/m$^2$. Consolidation pressure was varied from about 172 to about 690 kPa to investigate the influence of pressure on bond strength. The soak temperature was about 260° C. for all of the resistance welds.

A fusion bonded baseline strength was established by hot pressing the PS face of two 8.9 cm wide by 17.8 cm long laminates directly together (i.e., without a heating elements) at 240° C. for 1 hour under 690 kPa pressure, then cooling to room temperature under pressure. This sample was cut and tested identically to the DEA bonds.

EXPERIMENTAL RESULTS

Adhesive Bonds

Excellent shear strengths were attained with the DEA bonds, with a maximum of 28 MPa (from the one hour intermediate soak at about 121° C.), and fairly low scatter overall. For comparison, the hot press fusion bonded baseline gave a strength of 16.8 ±1.7 MPa. A trail of bonding the PPS side of identical laminates using FM300K with no surface preparation other than a solvent wipe gave essentially zero strength: the samples failed while being mounted in the test machine showing very poor adhesion, with clean separation of the FM300 from the PPS surface.

FIG. 4 shows shear strength plotted versus the final adhesive thickness as measured in micrographs of the bondline. There appears to be an optimum adhesive thickness, without taking into account other factors such as void content. FIG. 5 shows shear strength plotted versus soak time at intermediate temperature. There is evidently some enhancement of strength due to the longer time available for diffusion of the epoxy into the PS layer, as anticipated. The drop-off in strength at the longest soak time (about 120 minutes) is due in part to the reduced thickness of adhesive from flow out of the bondline. Thus the development of methodology to select an optimized intermediate soak must take into account bondline thickness effects due to the reduced viscosity of the adhesive at slightly elevated (below cure) temperatures. The effect of applied pressure on flow and void growth must be taken into account as well, particularly if only a reduced pressure for bonding was available due to geometric or load constraints. Alternatively, perhaps a reduced pressure, just sufficient to ensure good contact, during the initial "diffusion-enhancing" soak would reduce flow and excessive bondline thickness reduction.

The vacuum bagged adhesive cure had the least reduction of adhesive thickness from processing, although there was a large amount of flow from the bondline. The result was a very high void content in the adhesive, plainly visible to the naked eye in the failed specimens, from entrapped air during layup and outgassing during cure, which tend to expand in the partial vacuum. Still, a 21.6 MPa mean shear strength was attained, but with the largest amount of scatter. The open knit of the FM300K creates a dimpled surface texture which tends to trop air during layup. The other forms of FM300 film which are readily available, a tighter knit and a random mat material, are claimed to reduce the amount of entrapped air and allow closer control of final bondline thickness. These other forms are being acquired for further investigation. Cytec Personal conversation with John Paxton, Cytec Engineered Materials, Havre de Grace, Md., July 1994 states that another form could be produced given demand, a "one side tacky" (OST) from that consists of the random mat which is impregnated with the FM300 adhesive on only one side, aiding layup and further ensuring release of outgases and eliminating entrapped air as the epoxy flows through the mat and wets the "dry" side during the cure.

Resistance Welded Bonds

The strengths of the resistance welded fusion bonds were less than thought possible with that technique, although they were similar to the directly fusion bonded baseline performance, with a maximum of 14.7 ±0.1 MPa. Table 2 shows the results of each of the welds with the corresponding weld time and applied pressure.

TABLE 2

Results of resistance welds

| Trial # | Consolidation Pressure (kPa) | Weld Time (s) | Shear Strength (MPa) | Standard Deviation (MPa) |
| --- | --- | --- | --- | --- |
| 1 | 690 | 120 | 14.4 | 1.7 |
| 2 | 345 | 120 | 12.9 | 2.9 |
| 3 | 172 | 120 | 12.5 | 1.9 |
| 4 | 690 | 180 | 14.7 | 0.09 |
| 5 | 690 | 180 | 13.6 | 0.02 |

Although in all cases the failure surfaces were partially driven into the composite, the strengths achieved were much lower than those attained with adhesive bonding of the same adherends. The first cause that comes to mind is degradation of the PPS parent matrix or delamination of the composite at the bond temperature used (260° C.). The fusion bond baseline was exposed to that temperature for about 60 minutes, whereas the welds were held at temperature for only about 120 to about 180 seconds. Indeed, some improvement in strength and a large reduction in scatter was noted in the longest dwell time of 180 seconds. Perhaps there is some effect from the stainless steel heating element used for the welds. Other heating element materials, such as AS-4 (carbon)/PPS prepreg tape with comolded PSk have yet to be tried with this material system. The single lap shear test used may be the cause of some difference when compared to the double notch tests of the adhesive.

While there is shown and described herein certain specific structure embodying the invention, it will be manifest to those skilled in the art that various modifications and rearrangements of the parts maybe made without departing from the spirit and scope of the underlying inventive concept and that the same is not limited to the particular forms herein shown and described.

We claim:

1. A process of bonding a thermoplastic layer to a thermoset composite comprising:

selecting a thermoplastic material and a thermosetting monomer wherein said thermosetting monomer has similar solubility parameters to that of said thermoplastic material, bonding said thermoplastic material directly to the surface of said thermosetting monomer creating a cocured layered material and then processing said cocured layered material with either a thermoset adhesive or bond by fusion.

2. The process as claimed in claim 1, wherein said cocured material is processed by fusion bonding.

3. The process as claimed in claim 1, wherein said cocured material is processed with a thermoset adhesive.

4. The process as claimed in claim 1, wherein said thermoplastic material is either polystyrene or polyetherimide.

5. The process as claimed in claim 1, wherein said thermosetting monomer is bismaleimide.

6. The process as claimed in claim 4, wherein said thermosetting monomer is bismaleimide.

7. The process as claimed in claim 1, wherein the solubility parameters of said thermoplastic material and said thermosetting monomer are matched within about ±2.0 $(J/cm^2)^{1/2}$ of each other.

8. The process as claimed in claim 1, wherein the solubility parameters of said thermoplastic material and said thermosetting monomer are matched within ±1.0 $(J/cm^2)^{1/2}$ of each other.

9. The process as claimed in claim 1, wherein said thermoplastic material is selected from the group consisting of polystyrene, polyetherimide, polysulfone and polyethersulfone.

10. The process as claimed in claim 1, wherein the layered composite material comprises at least three different layers.

11. A process of manufacturing a layered composite material comprising:

selecting a thermoplastic material and a thermosetting monomer wherein said thermosetting monomer has similar solubility parameters to that of said thermoplastic material, bonding said thermoplastic material directly to said thermosetting monomer and creating a layered cocured material.

12. The process as claimed in claim 11, wherein said thermoplastic material is either polystyrene or polyetherimide and said thermosetting monomer is bismaleimide.

13. The process as claimed in claim 12, wherein the solubility parameters of said thermoplastic material and said thermosetting monomer are matched within ±1.0 $(J/cm^2)^{1/2}$ of each other.

14. The process as claimed in claim 11, wherein said thermoplastic material is selected from the group consisting of polystyrene, polyetherimide, polysulfone and polyethersulfone.

15. The process as claimed in claim 11, wherein the layered composite material comprises at least three different layers.

16. The process as claimed in claim 10, wherein the layered composite material comprises one thermoplastic layer, one thermosetting layer and an interface layer made of the thermoplastic and thermosetting material.

17. The process as claimed in claim 15, wherein the layered composite material comprises one thermoplastic layer, one thermosetting layer and an interface layer made of the thermoplastic and thermosetting material.

* * * * *